(12) United States Patent
Tian et al.

(10) Patent No.: US 10,053,229 B2
(45) Date of Patent: Aug. 21, 2018

(54) AIRCRAFT SYSTEM

(71) Applicant: Yuneec Technology Co., Limited, Hong Kong (CN)

(72) Inventors: Yu Tian, Jiangsu (CN); Wenyan Jiang, Jiangsu (CN)

(73) Assignee: Yuneec Technology Co., Limited, Hong Kong (CN)

( * ) Notice: Subject to any disclaimer, the term of this patent is extended or adjusted under 35 U.S.C. 154(b) by 12 days.

(21) Appl. No.: 15/529,779

(22) PCT Filed: Dec. 18, 2015

(86) PCT No.: PCT/CN2015/097804
§ 371 (c)(1),
(2) Date: May 25, 2017

(87) PCT Pub. No.: WO2016/095837
PCT Pub. Date: Jun. 23, 2016

(65) Prior Publication Data
US 2017/0305574 A1 Oct. 26, 2017

(30) Foreign Application Priority Data
Dec. 18, 2014 (CN) .................... 2014 2 0814036 U

(51) Int. Cl.
G03B 15/00 (2006.01)
B64D 47/08 (2006.01)
H04N 5/232 (2006.01)
F16M 11/20 (2006.01)
F16M 11/08 (2006.01)

(52) U.S. Cl.
CPC ............. *B64D 47/08* (2013.01); *F16M 11/08* (2013.01); *F16M 11/2035* (2013.01); *G03B 15/006* (2013.01); *H04N 5/23206* (2013.01)

(58) Field of Classification Search
CPC .. G03B 15/006; F16M 11/08; F16M 11/2035; H04N 5/23206
USPC .......................................................... 396/12
See application file for complete search history.

(56) References Cited

U.S. PATENT DOCUMENTS

| 9,273,981 | B1 * | 3/2016 | Downey | B64C 39/024 |
| 9,280,038 | B1 * | 3/2016 | Pan | G03B 17/561 |
| 2009/0219393 | A1 * | 9/2009 | Vian | G07C 5/008 348/144 |
| 2010/0302359 | A1 * | 12/2010 | Adams | B64C 39/024 348/117 |
| 2011/0301784 | A1 * | 12/2011 | Oakley | B64C 27/04 701/2 |
| 2012/0300070 | A1 * | 11/2012 | Ohtomo | G01C 11/02 348/144 |

(Continued)

FOREIGN PATENT DOCUMENTS

CN 203490821 U 3/2014

*Primary Examiner* — Clayton E Laballe
*Assistant Examiner* — Linda B Smith

(57) ABSTRACT

An aircraft system (1) includes an aircraft apparatus (31) including an image capturing device (33) and a remote control (32). The remote control (32) includes a display (321), a first communication circuit (322) adapted for transmitting aircraft control signals to the aircraft apparatus (31), and a second communication circuit (323) adapted for receiving image signals of the image capturing device. The display (321) is adapted for displaying the image signals.

16 Claims, 3 Drawing Sheets

(56) References Cited

U.S. PATENT DOCUMENTS

2014/0146147 A1\* 5/2014 Seo .................... H04N 13/0497
348/56
2017/0264796 A1\* 9/2017 Tian ..................... H04N 5/2252

\* cited by examiner

AIRCRAFT SYSTEM

CROSS REFERENCE OF RELATED APPLICATION

This is a U.S. National Stage under 35 U.S.C. 371 of the International Application PCT/CN2015/097804, filed Dec. 18, 2015, which claims priority under 35 U.S.C. 119(a-d) to CN201420814036.9, filed Dec. 18, 2014. The full text of the above-mentioned Chinese patent application is included in the present invention.

BACKGROUND OF THE PRESENT INVENTION

Field of Invention

The present invention relates to an aircraft system.

Description of Related Arts

In the prior art, the aircraft is usually capable of achieving aerial photography, and the images acquired by the aircraft need to be displayed by a separate display device, so that it is difficult for the user to observe the images. Moreover, the image signals obtained by the aircraft in the transmission process are susceptible to be interfered, so the signal transmission between the aircraft and the remote control is not stable and reliable enough.

SUMMARY OF THE PRESENT INVENTION

A technical problem to be resolved of the present invention is to provide an aircraft system which is convenient for the user to observe and has stable signal transmission, so as to overcome drawbacks in the prior art that the images obtained by the aircraft system are inconvenient for the user to observe, and are instable and unreliable in the signal transmission.

The present invention resolves the above technical problem through a technical solution as follows. An aircraft system comprises an aircraft apparatus comprising an image capturing device and a remote control, wherein: the remote control comprises a display, a first communication circuit adapted for transmitting aircraft control signals to the aircraft apparatus, and a second communication circuit adapted for receiving image signals of the image capturing device; the display is adapted for displaying the image signals.

The remote control provided by the present invention comprises the display for displaying the image signals; while controlling the aircraft apparatus through the remote control, the operator is capable of intuitively observing images captured by the image capturing device, thus providing convenience for the user. Moreover, the remote control provided by the present invention utilizes two communication circuits, so two antennas are provided for respectively communicating with an aircraft unit and the image capturing device, the transmission of the control signals is independent and not interferential from the transmission of the image signals, thus the signal transmission is more stable and reliable.

Preferably, the aircraft apparatus comprises a gimbal, and an aircraft unit is connected with the image capturing device through the gimbal.

Preferably, the aircraft apparatus comprises a power supply circuit for providing the image capturing device with power.

Preferably, the first communication circuit is a 2.4 GHz communication circuit, and the second communication circuit is a 5.8 GHz communication circuit.

Preferably, the gimbal is connected with the aircraft unit through a gimbal connector; the gimbal connector comprises a connecting body; two buckling parts respectively outwardly extend from a front side and a rear side of the connecting body, so as to buckle with the gimbal for limiting the movement of the gimbal in the vertical direction and the front and rear directions; multiple fixed parts are disposed on the connecting body.

Preferably, an upper shock absorption plate is disposed between the gimbal connector and the gimbal; two buckling components, respectively corresponding to the two buckling parts, are disposed at a top surface of the upper shock absorption plate; and the two buckling components are respectively buckled with the two buckling parts.

Preferably, a position where the top surface of the upper shock absorption plate is close to the two buckling components has two channels, each of the two buckling components has an L-shaped cross section; the two channels are respectively located under the two buckling components; two first limit parts respectively outwardly extend from a front side and a rear side at a right end portion of the connecting body, and are respectively against a right end portion of the two buckling components; the connecting body has an accommodating groove at a left end portion thereof; a second limit part is disposed at a left end face of the accommodating groove, is located in the accommodating groove, and is against the left end face of the upper shock absorption plate.

Preferably, the aircraft apparatus comprises an aircraft control circuit; the gimbal comprises a first motor, a second motor, a third motor, an image transmission unit and an inertial measurement unit, wherein the first motor, the second motor and the third motor are respectively adapted for controlling the rotation along three axial directions of a three-dimensional coordinate system; the aircraft control unit is adapted for respectively electrically connecting with the first motor, the second motor and the third motor through three-phase wires, and is also adapted for electrically connecting with the inertial measurement unit through communication wires.

Preferably, the second communication circuit is a 5.8 GHz Wi-Fi communication circuit.

The positive effects of the present invention are that: in the aircraft system provided by the present invention, the control signals for controlling the aircraft and the image signals transmitted by the image capturing device are not interferential from each other to stabilize the signal transmission; the display is capable of directly displaying the image signals to convenient for the user. The image signals are transmitted through the 5.8 GHz communication circuit, so that the images displayed by the display become more fluent.

DETAILED DESCRIPTION OF THE PREFERRED EMBODIMENT

Figure 1:
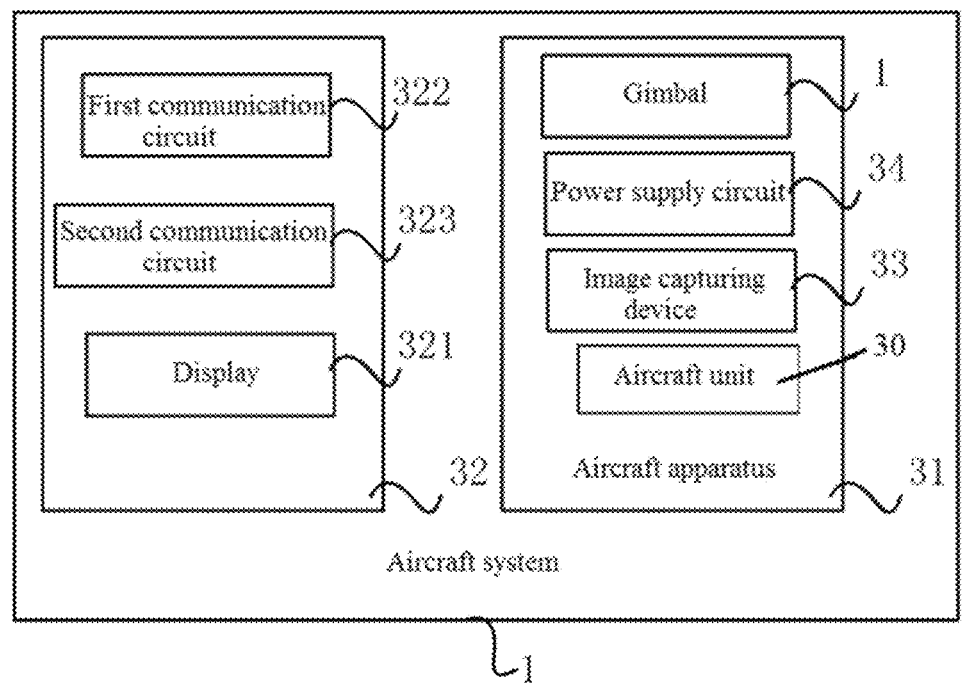
FIG. 1 is a structurally schematic view of an aircraft system according to a preferred embodiment of the present invention.

The present invention is further more clearly and completely explained with accompanying preferred embodiments and drawings as follows.

In description of the present invention, it should be understood that the orientation or position relationship described by words such as "upper", "lower", "front", "rear", "left", "right", "vertical", "horizontal", "top", "bottom", "internal" and "external" is based on the accompanying drawing, which is only for simplifying the description of the present invention, not for indicating or implying a specific orientation, and a structure and an operation at the specific orientation of the devices or parts. Thus, the above words are not the limitations of the present invention.

Referring to FIGS. 1-5, the present invention provides an aircraft system which comprises an aircraft apparatus 31 comprising an image capturing device 33 and a remote control 32, wherein: the remote control 32 comprises a display 321, a first communication circuit 322 adapted for transmitting aircraft control signals to the aircraft apparatus, and a second communication circuit 323 adapted for receiving image signals of the image capturing device; the display is adapted for displaying the image signals; the first communication circuit 322 is a 2.4 GHz communication circuit, and the second communication circuit 323 is a 5.8 GHz Wi-Fi (wireless fidelity) communication circuit.

The aircraft control signals of the remote control are sent to an aircraft control circuit 35 of the aircraft apparatus through 2.4 GHz communication signals 41, the remote control is communicated with the image capturing device through 5.8 GHz Wi-Fi communication signals 42. Both the aircraft control circuit and the power supply circuit 34 of the aircraft apparatus are communicated with the image capturing device 33 through wires 43.

The aircraft apparatus further comprises a gimbal 1 and the power supply circuit 34, wherein in the aircraft apparatus, the gimbal is connected with the image capturing device, and the power supply circuit is adapted for providing the image capturing device with power.

The gimbal 1 is connected with an aircraft unit 30 through a gimbal connector 2; an upper shock absorption plate 11 is disposed between the gimbal connector and the gimbal; two buckling components 111 are disposed at a top surface of the upper shock absorption plate 11, each of the two buckling components 111 has an L-shaped cross section. Both of the two buckling components 111 are provided along a length direction of the gimbal connector 2, that is, along a left and right direction thereof; and are same in length and opposite to each other.

Figure 2:
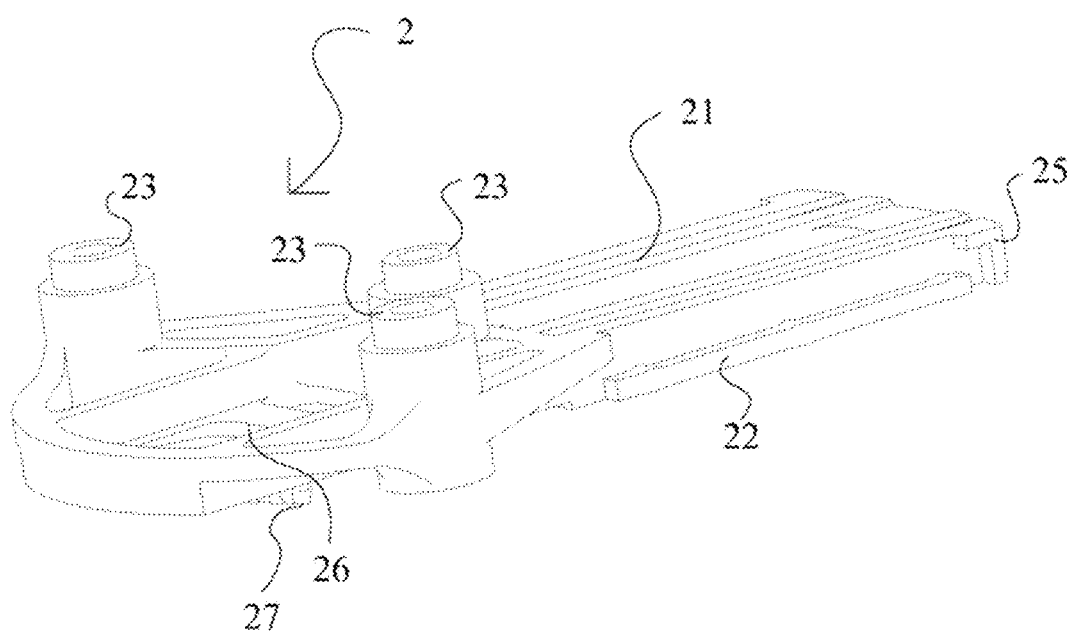
FIG. 2 is a three-dimensionally structurally schematic view of a gimbal connector according to the preferred embodiment of the present invention.
Figure 3:
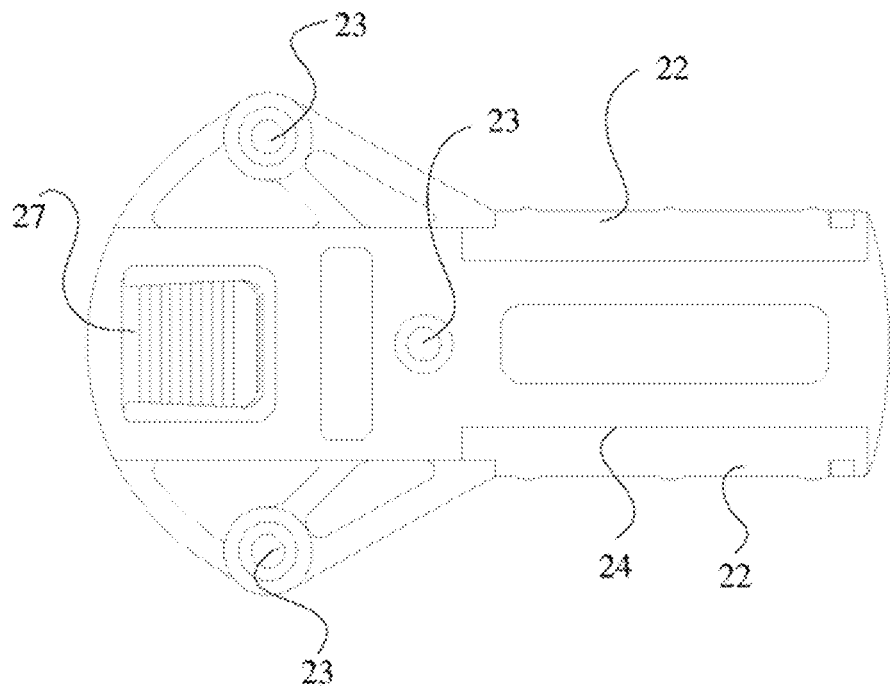
FIG. 3 is a top view of FIG. 2.
Figure 4:
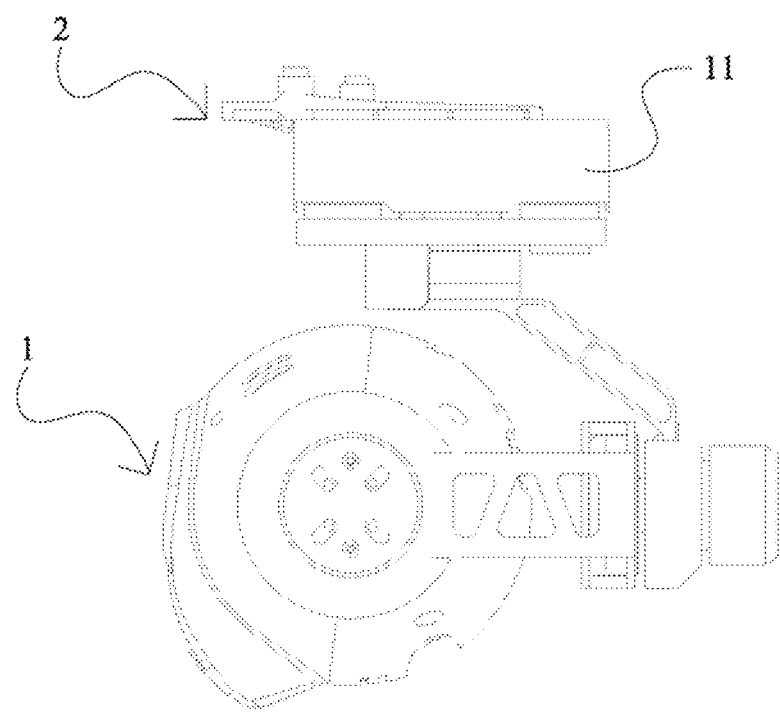
FIG. 4 is a three-dimensionally structurally schematic view of a gimbal of the aircraft system according to the preferred embodiment of the present invention.
Figure 5:
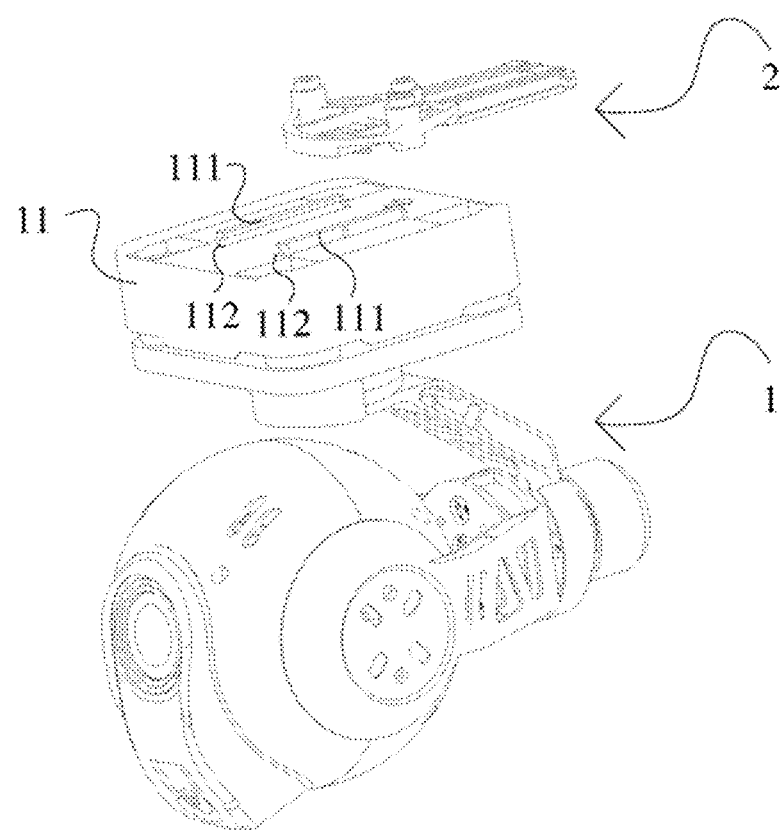
FIG. 5 is an exploded schematic view of the gimbal of the aircraft system according to the preferred embodiment of the present invention.
Figure 6:
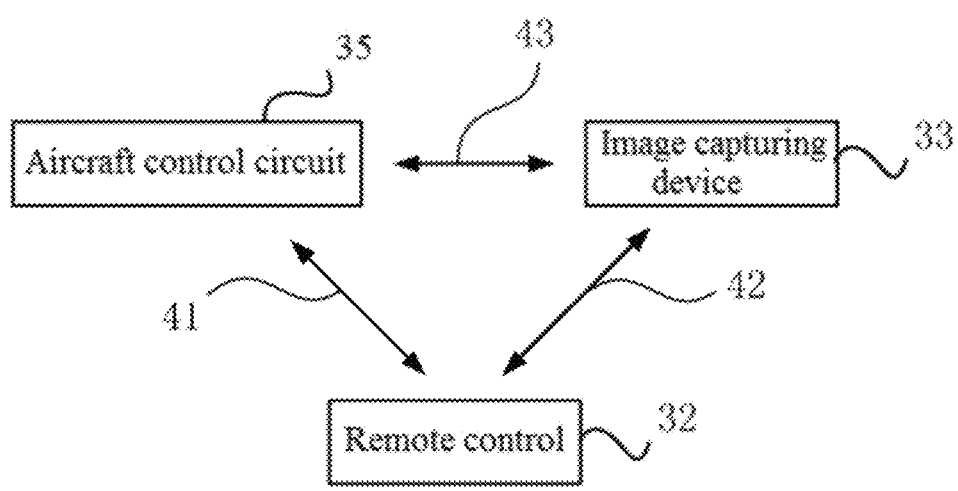
FIG. 6 is another structurally schematic view of the aircraft system according to another preferred embodiment of the present invention.

As shown in FIGS. 1-3, the gimbal connector 2 comprises a connecting body 21, wherein: two buckling parts 22 respectively outwardly extend from a front side and a rear side of the connecting body 21, so as to buckle with the gimbal for limiting the movement of the gimbal in the vertical direction and the front and rear directions; the two buckling parts 22 are respectively corresponding to and buckled with the two buckling components 111, such that the gimbal is capable of being conveniently buckled with and detached from the gimbal connector 2.

Of course, according to actual needs, both a left end face and a right end face of the connecting body 21 are arched, wherein: a width of the left end face of the connecting body 21 is larger than a width of the right end face of the connecting body; the two buckling parts 22 are disposed at the right end face of the connecting body 21 and integrated with the connecting body 21; multiple fixed parts 23 are disposed on the connecting body 21. Due to simple structure, small volume and light weight, the gimbal connector 2 is convenient for being fixed to various devices through the fixed parts 23, such as aircrafts or holding frames.

A position where the top surface of the upper shock absorption plate 11 is close to the two buckling components 111 has two channels 112, each of the two buckling components 111 has an L-shaped cross section, the two channels 112 are respectively located under the two buckling components 111, so as to further reduce a contract area of the top surface of the gimbal and a bottom surface of the gimbal connector 2, to more convenient for assembly and disassembly between the gimbal and the gimbal connector 2.

Two first limit parts 25 respectively outwardly extend from a front side and a rear side at a right end portion of the connecting body 21, for being respectively against a right end portion of the two buckling components 111, so as to limit the movement of the upper shock absorption plate 11 of the gimbal along a longitudinal direction of the connecting body 21.

In this preferred embodiment, the first limit parts 25 are respectively against the right end portion of the two buckling components 111, so as to limit a forward direction when the gimbal is inserted into the gimbal connector 2, for avoiding sliding out of the buckling components 111 of the gimbal connector 2 due to too much progress; the first limit parts 25 respectively match with the buckling parts 22 to play a limit role in the vertical direction.

Moreover, the connecting body 21 has an accommodating groove 26 at a left end portion thereof; a second limit part 27 is disposed at a left end face of the accommodating groove 26 for limiting the gimbal to move along the length direction of the connecting body 21; also, the second limit part 27 is located in the accommodating groove 26, and upwardly bends while applying an upward force to the second limit part 27.

The second limit part 27 plays a role in limiting positions; when the gimbal is inserted into the gimbal connector, the direction opposite to an advanced direction of the gimbal is limited to prevent the gimbal from reversely moving; simultaneously, the second limit part 27 upwardly bends while applying the upward force to the second limit part 27 to convenient for inserting the gimbal into the gimbal connector 2 or removing the gimbal out of the gimbal connector 2.

Furthermore, the second limit part 27 is against a left end face of the upper shock absorption plate 11, so as to limit the upper shock absorption plate 11 to move along the left and right direction, for avoiding the gimbal being detached from the gimbal connector 2 in the process of shooting.

The aircraft apparatus further comprises an aircraft control circuit; the gimbal comprises a first motor, a second motor, a third motor, an image transmission unit and an inertial measurement unit, wherein the first motor, the second motor and the third motor are respectively adapted for controlling the rotation along three axial directions of a three-dimensional coordinate system; the aircraft control unit is adapted for respectively electrically connecting with the first motor, the second motor and the third motor through three-phase wires, and is also adapted for electrically connecting with the inertial measurement unit through communication wires.

According to the preferred embodiment of the present invention, the control signals of the aircraft unit in the aircraft system and the image signals transmitted by the image capturing device are not interfered with each other, and the transmission becomes more stable, the display is capable of directly displaying the image signals to convenient for the user. The image signals are transmitted through a 5.8 GHz communication circuit, so that the images displayed by the display become more fluent.

While the specific embodiments of the present invention have been described above, it should be understood by one skilled in the art that these embodiments are merely illustrative and that various changes or modifications may be made to these embodiments without departing from the principles and spirit of the present invention. Accordingly, the protective scope of the present invention is limited by the appended claims.

What is claimed is:

1. An aircraft system, comprising an aircraft apparatus comprising an image capturing device and a remote control, wherein:
   the remote control comprises a display, a first communication circuit adapted for transmitting aircraft control signals to the aircraft apparatus, and a second communication circuit adapted for receiving image signals of the image capturing device; the display is adapted for displaying the image signals;
   the aircraft apparatus comprises a gimbal, an aircraft unit is connected with the image capturing device through the gimbal;
   the gimbal is connected with the aircraft unit through a gimbal connector; the gimbal connector comprises a connecting body; two buckling parts respectively outwardly extend from a front side and a rear side of the connecting body, so as to buckle with the gimbal for limiting the movement of the gimbal in the vertical direction and the front and rear directions;
   an upper shock absorption plate is disposed between the gimbal connector and the gimbal; two buckling components, respectively corresponding to the two buckling parts, are disposed at a top surface of the upper shock absorption plate; the two buckling components are respectively buckled with the two buckling parts;
   a position where the top surface of the upper shock absorption plate is close to the two buckling components has two channels, each of the two buckling components has an L-shaped cross section; the two channels are respectively located under the two buckling components; two first limit parts respectively outwardly extend from a front side and a rear side at a right end portion of the connecting body, and are respectively against a right end portion of the two buckling components; the connecting body has an accommodating groove at a left end portion thereof; a second limit part is disposed at a left end face of the accommodating groove, is located in the accommodating groove, and is against the left end face of the upper shock absorption plate.

2. The aircraft system, as recited in claim 1, wherein the aircraft apparatus comprises a power supply circuit for providing the image capturing device with power.

3. The aircraft system, as recited in claim 1, wherein the first communication circuit is a 2.4 GHz communication circuit, the second communication circuit is a 5.8 GHz communication circuit.

4. The aircraft system, as recited in claim 1, wherein the aircraft apparatus comprises an aircraft control circuit; the gimbal comprises a first motor, a second motor, a third motor, an image transmission unit and an inertial measurement unit, wherein the first motor, the second motor and the third motor are respectively adapted for controlling the rotation along three axial directions of a three-dimensional coordinate system; the aircraft control unit is adapted for respectively electrically connecting with the first motor, the second motor and the third motor through three-phase wires, and is also adapted for electrically connecting with the inertial measurement unit through communication wires.

5. The aircraft system, as recited in claim 1, wherein the second communication circuit is a 5.8 GHz Wi-Fi communication circuit.

6. The aircraft system, as recited in claim 2, wherein the aircraft apparatus comprises an aircraft control circuit; the gimbal comprises a first motor, a second motor, a third motor, an image transmission unit and an inertial measurement unit, wherein the first motor, the second motor and the third motor are respectively adapted for controlling the rotation along three axial directions of a three-dimensional coordinate system; the aircraft control unit is adapted for respectively electrically connecting with the first motor, the second motor and the third motor through three-phase wires, and is also adapted for electrically connecting with the inertial measurement unit through communication wires.

7. The aircraft system, as recited in claim 2, wherein the second communication circuit is a 5.8 GHz Wi-Fi communication circuit.

8. The aircraft system, as recited in claim 2, wherein the first communication circuit is a 2.4 GHz communication circuit, the second communication circuit is a 5.8 GHz communication circuit.

9. The aircraft system, as recited in claim 3, wherein the aircraft apparatus comprises an aircraft control circuit; the gimbal comprises a first motor, a second motor, a third motor, an image transmission unit and an inertial measurement unit, wherein the first motor, the second motor and the third motor are respectively adapted for controlling the rotation along three axial directions of a three-dimensional coordinate system; the aircraft control unit is adapted for respectively electrically connecting with the first motor, the second motor and the third motor through three-phase wires, and is also adapted for electrically connecting with the inertial measurement unit through communication wires.

10. The aircraft system, as recited in claim 3, wherein the second communication circuit is a 5.8 GHz Wi-Fi communication circuit.

11. The aircraft system, as recited in claim 4, wherein the second communication circuit is a 5.8 GHz Wi-Fi communication circuit.

12. The aircraft system, as recited in claim 6, wherein the second communication circuit is a 5.8 GHz Wi-Fi communication circuit.

13. The aircraft system, as recited in claim 8, wherein the aircraft apparatus comprises an aircraft control circuit; the gimbal comprises a first motor, a second motor, a third motor, an image transmission unit and an inertial measurement unit, wherein the first motor, the second motor and the third motor are respectively adapted for controlling the rotation along three axial directions of a three-dimensional coordinate system; the aircraft control unit is adapted for respectively electrically connecting with the first motor, the second motor and the third motor through three-phase wires, and is also adapted for electrically connecting with the inertial measurement unit through communication wires.

14. The aircraft system, as recited in claim 8, wherein the second communication circuit is a 5.8 GHz Wi-Fi communication circuit.

15. The aircraft system, as recited in claim 9, wherein the second communication circuit is a 5.8 GHz Wi-Fi communication circuit.

16. The aircraft system, as recited in claim 13, wherein the second communication circuit is a 5.8 GHz Wi-Fi communication circuit.

* * * * *